US012583213B2

(12) United States Patent
Bicego et al.

(10) Patent No.: US 12,583,213 B2
(45) Date of Patent: Mar. 24, 2026

(54) LAMINATING MACHINE FOR PRODUCING MULTILAYER FILMS

(71) Applicant: UTECO CONVERTING S.P.A., Colognola Ai Colli (IT)

(72) Inventors: Alessandro Bicego, San Giovanni Lupatoto (IT); Pietro Aspes, Verona (IT)

(73) Assignee: UTECO CONVERTING S.P.A., Colognola Ai Colli (IT)

( * ) Notice: Subject to any disclaimer, the term of this patent is extended or adjusted under 35 U.S.C. 154(b) by 122 days.

(21) Appl. No.: 18/403,189

(22) Filed: Jan. 3, 2024

(65) Prior Publication Data

US 2024/0239094 A1      Jul. 18, 2024

(30) Foreign Application Priority Data

Jan. 12, 2023    (IT) ........................ 102023000000264

(51) Int. Cl.
*B32B 41/00*        (2006.01)
*B32B 37/12*        (2006.01)
*B32B 38/18*        (2006.01)
(52) U.S. Cl.
CPC ...... *B32B 38/1808* (2013.01); *B32B 37/1284* (2013.01)
(58) Field of Classification Search
CPC ..... B32B 37/1284; B32B 37/02; B32B 39/00; B32B 37/0046; B32B 37/203; B32B 38/18; B32B 38/1816; B32B 2439/70; B32B 2439/80; B32B 38/1808
USPC .................... 156/60, 64, 350, 351, 378, 379
See application file for complete search history.

(56) References Cited

U.S. PATENT DOCUMENTS

| | | | | |
|---|---|---|---|---|
| 5,795,426 | A | * | 8/1998 | Jackson .............. B32B 38/1816 |
| | | | | 156/543 |
| 8,142,592 | B2 | | 3/2012 | Miller, II |
| 2014/0124237 | A1 | | 5/2014 | Demers |

FOREIGN PATENT DOCUMENTS

DE        102004035649 B4        2/2008

OTHER PUBLICATIONS

Italian Search Report and Written Opinion dated Jul. 7, 2023 issued in IT 202300000264, with partial translation.

* cited by examiner

*Primary Examiner* — Michael N Orlando
*Assistant Examiner* — Joshel Rivera
(74) *Attorney, Agent, or Firm* — Scully, Scott, Murphy & Presser, P.C.

(57)        ABSTRACT

A laminating machine for producing multilayer films, which comprises at least one first unwinding assembly for a first film, at least one second unwinding assembly for a second film, and at least one third unwinding assembly for a third film; laminating means for laminating together the films, with the interposition of an adhesive material, and applicator means of the adhesive material; the first unwinding assembly and the second unwinding assembly are arranged along a first direction of extension of the machine; the third unwinding assembly is arranged along a second direction of extension of the machine which is substantially transverse with respect to the first direction of extension, and is positioned laterally with respect to a vertical plane which is substantially parallel to the first direction of extension and passes through the first unwinding assembly and the second unwinding assembly.

9 Claims, 4 Drawing Sheets

LAMINATING MACHINE FOR PRODUCING MULTILAYER FILMS

Figure 1:
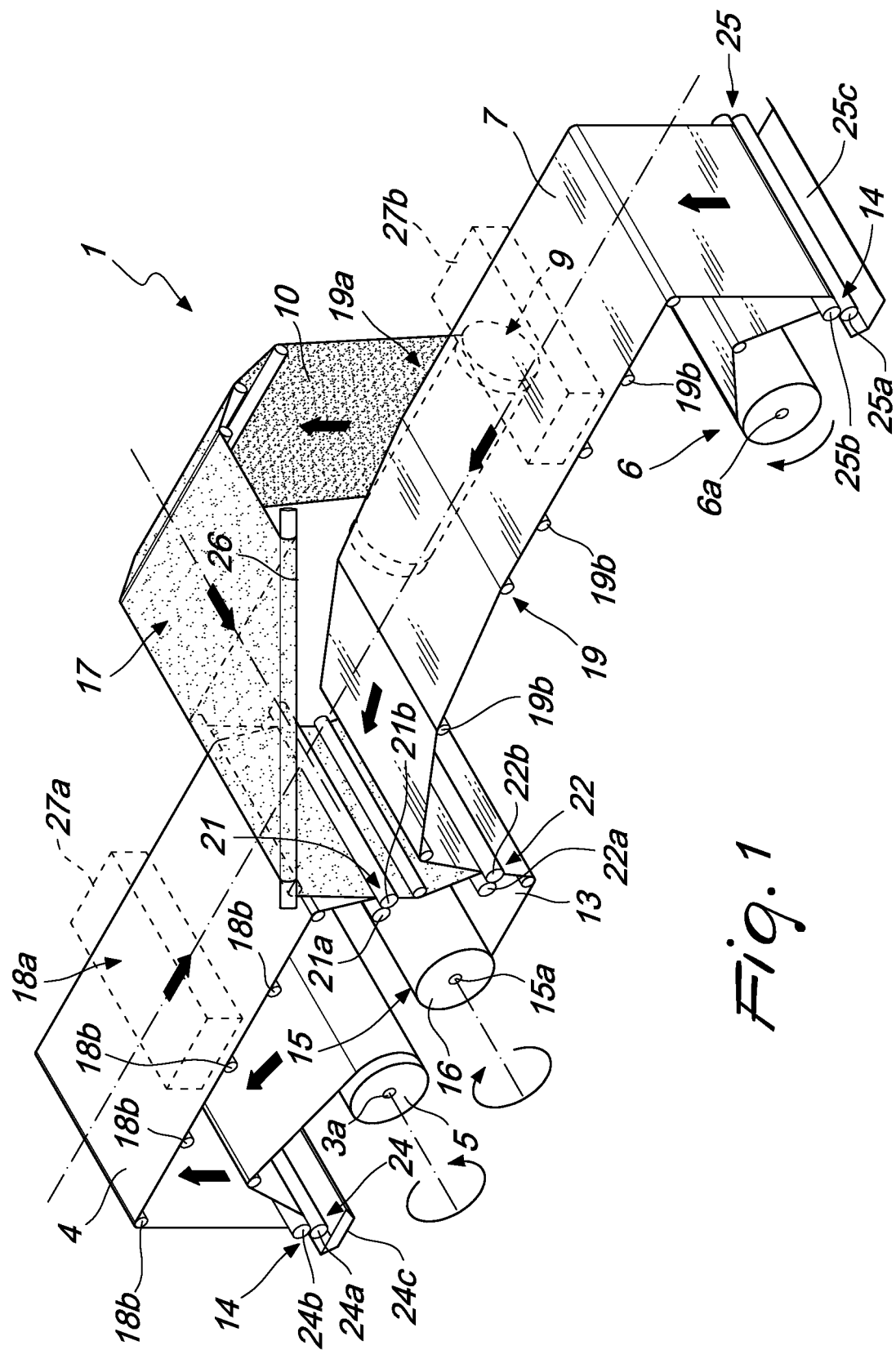

The present invention relates to a laminating machine for producing multilayer films.

Laminating machines are known which make it possible to laminate together films made of different materials in order to obtain multilayer films which are used, for example, for packaging products.

In particular, machines are known which make it possible to laminate two films together so as to obtain a laminated film, constituted by two different layers, which has the characteristics of both of the films that go to make it up.

These machines are commonly known as "duplex" machines and are constituted, generally, by a supporting structure that supports a first unwinding assembly which makes it possible to take a first film from a first spool and feed it to an assembly for applying an adhesive material and a second unwinding assembly which makes it possible to take, from a second spool, a second film which is laminated to the first film in a laminating unit, downstream of which the obtained laminated film is wound on a third spool by a winding assembly.

Currently, in order to provide laminated films formed from three different layers, what usually happens is that a spool of a laminated film formed from two layers is mounted on the first unwinding assembly of a duplex machine, and a spool of a third film is mounted on the second unwinding assembly, so as to be able to laminate, in the laminating unit of the machine, the laminated film formed from two layers together with the third film.

This method of working is quite laborious, however.

Laminating machines have been provided, commonly called "triplex" machines, which make it possible to laminate three different films together with an in-line process.

These machines are basically constituted by two duplex machines arranged in series, which are connected together so that the laminated film in output from the first machine can be fed to the second machine for laminating the third film.

In particular, in order to connect the two machines together, the laminated film obtained in the first machine, instead of being collected by a winding assembly, is conveyed through a passage pit, under the floor on which the two machines are installed, so that the film in output from the first machine can arrive at the second machine at the adhesive material applicator assembly of the second machine.

Triplex machines, thus structured, in addition to being considerably bulky, have some drawbacks which are linked, in particular, to the presence of the passage pit.

In fact, providing the passage pit requires time and space to carry out the related excavation and preparation works, with consequent lengthening of the overall installation time of the machine.

Furthermore, in the passage pit it is easy for dust and dirt to accumulate, which is undesirable in the production of laminated films intended for use in packaging foods or medical/pharmaceutical products.

Another drawback of the known triplex machines is that, if solvent-based adhesive materials are used, as in the majority of cases, the solvent vapors tend to accumulate in the passage pit, making the atmosphere inside the pit explosive, such that it is necessary to install fans, which increase the overall costs of the machine.

The aim of the present invention is to provide a laminating machine for producing multilayer films which is capable of avoiding the drawbacks of the known art in one or more of the above-mentioned aspects.

Within this aim, an object of the invention is to provide a laminating machine for producing multilayer films that is extremely compact from the dimensional point of view.

Another object of the invention is to provide a laminating machine for producing multilayer films that is faster and cheaper to install with respect to conventional machines.

Another object of the present invention is to provide a laminating machine for producing multilayer films that is capable of offering the highest guarantees in the production of multilayer films.

A further object of the present invention is to overcome the drawbacks of the known art in an alternative manner to any existing solutions.

Another object of the invention is to provide a laminating machine for producing multilayer films that is highly reliable and relatively easy to provide, and which is competitive from a purely economic viewpoint as well.

This aim and these and other objects which will become more apparent hereinafter are achieved by a laminating machine for producing multilayer films according to claim 1, optionally provided with one or more of the characteristics of the dependent claims.

Figure 2:
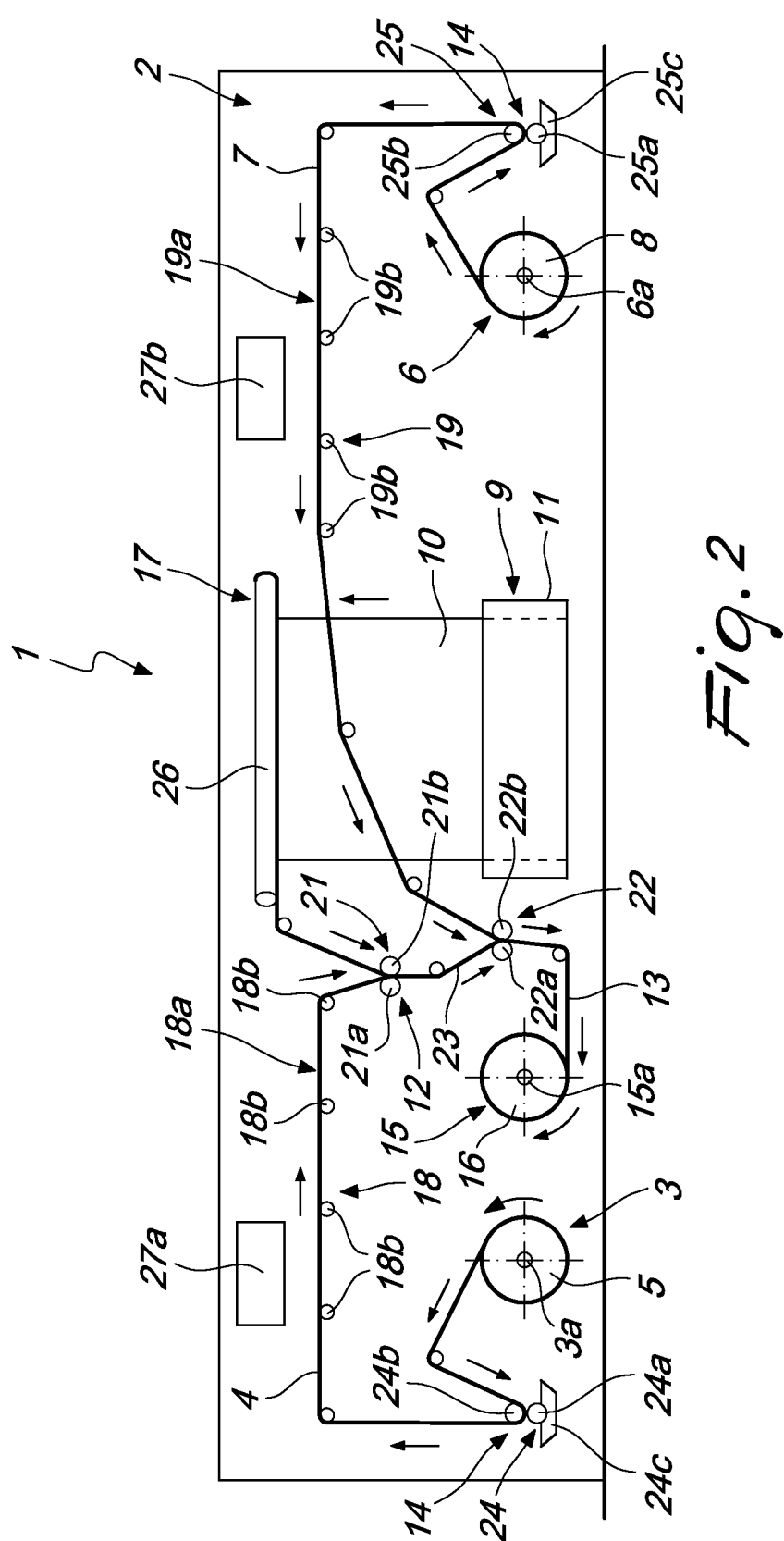
Figure 3:
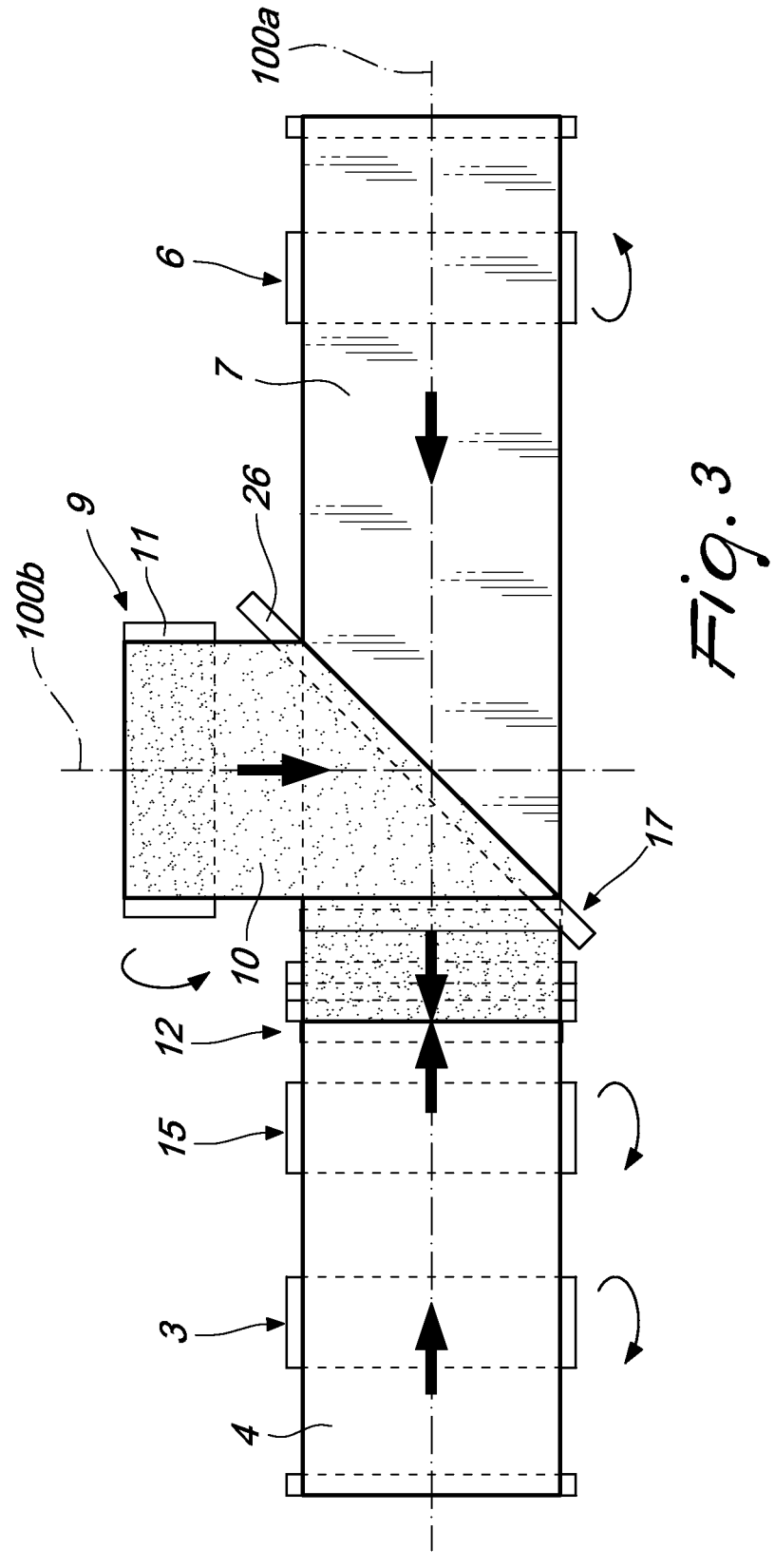
Figure 4:
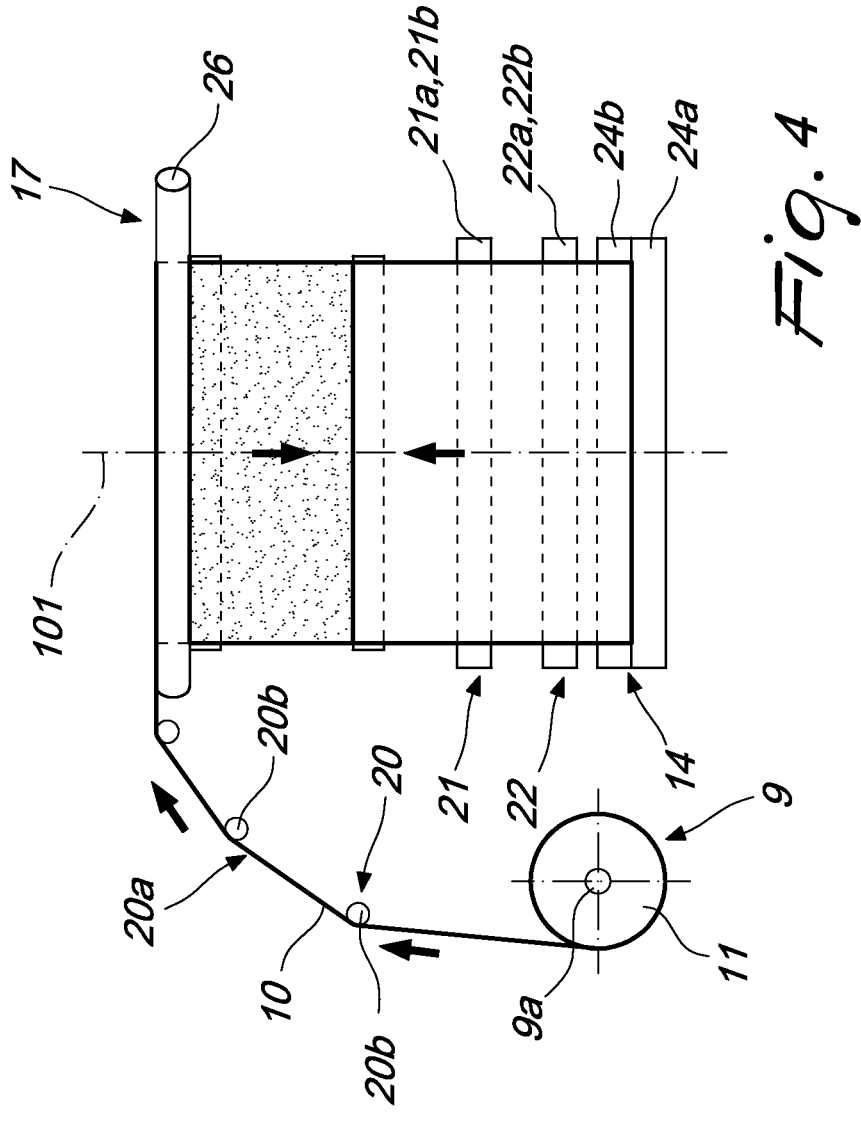

Further characteristics and advantages of the invention will become better apparent from the detailed description that follows of a preferred, but not exclusive, embodiment of the laminating machine for producing multilayer films according to the invention, which is illustrated for the purposes of non-limiting example in the accompanying drawings wherein:

FIG. 1 is a perspective schematic view of a laminating machine according to the invention;

FIG. 2 schematically illustrates, in a front elevation view, the machine according to the invention;

FIG. 3 is a schematic plan view from above of the machine according to the invention;

FIG. 4 schematically illustrates, in a side view, the machine according to the invention.

With reference to the figures, the laminating machine for producing multilayer films according to the invention, generally designated by the reference numeral 1, comprises, on a supporting structure 2, at least one first unwinding assembly 3, which is configured to make it possible to take a first film 4 from a first spool 5, and at least one second unwinding assembly 6, which in turn is configured to make it possible to take a second film 7 from a second spool 8.

In particular, the first unwinding assembly 3 and the second unwinding assembly 6 are arranged along a first direction of extension 100a of the machine.

The machine according to the invention further comprises at least one third unwinding assembly 9, which makes it possible to take a third film 10 from a third spool 11.

Each unwinding assembly 3, 6 and 9 conveniently comprises a respective unwinder roller or axle 3a, 6a, 9a about which the corresponding spool 5, 8 and 11 is mounted.

The machine is further provided with laminating means 12, which are configured to laminate together, by virtue of the interposition of adhesive material, the first film 4, the second film 7 and the third film 10, so as to obtain a multilayer laminated film 13.

In particular, the adhesive material that is interposed between the films 4, 7 and 10 is applied by way of applicator means 14, which are arranged upstream of the laminating means 12.

The machine according to the invention is also provided with at least one winding assembly 15, which is arranged downstream of the laminating means 12 and which makes it possible to wind the obtained multilayer laminated film 13 on a fourth spool 16.

Conveniently, the winding assembly 15 is provided by a winding roller 15a around which the fourth spool 16 is wound.

The third unwinding assembly 9 is arranged along a second direction of extension 100b of the machine, which is substantially transverse with respect to the first direction of extension 100a.

In particular, the third unwinding assembly 3 is positioned laterally, with respect to a vertical plane 101 of the machine, which is substantially parallel to the first direction of extension 100a and which passes through the first unwinding assembly 3 and through the second unwinding assembly 6.

Advantageously, the first and the second unwinding assemblies 3 and 6 are positioned substantially at two opposing end regions of the machine which are located along the first direction of extension 100a, while the third unwinding assembly 9 is located, along the second direction of extension 100b, in a substantially intermediate position between the two end regions of the machine where the first and the second unwinding assemblies 3 and 6 are positioned.

Conveniently, the rotation axis of the third spool 11, defined by the third unwinding assembly 9, is oriented substantially parallel with respect to the first direction of extension 100a of the machine, while the rotation axes of the first and of the second spool 5 and 8, respectively defined by the first and by the second unwinding assemblies 3 and 6, are oriented substantially perpendicular to the first direction of extension 100a and substantially parallel to the second direction of extension 100b.

Advantageously, the laminating means 12 are interposed between the first unwinding assembly 3 and the second unwinding assembly 6, along the first direction of extension 100a.

More preferably, the laminating means 12 are arranged in a substantially intermediate position between the two opposing end regions of the machine where the first and the second unwinding assemblies 3 and 6 are located, along the first direction of extension 100a.

Advantageously, between the third unwinding assembly 9 and the laminating means 12, there are redirection means 17 of the third film 10 which are designed to redirect the advancement path of the third film 10, so that, downstream of such redirection means 17, the advancement path of the third film 10 is oriented along a direction having at least one component substantially parallel to the first direction of extension 100a, as will also be explained below.

In more detail, the machine according to the invention conveniently comprises first conveyor means 18, which make it possible to convey the first film 4, on its path from the first unwinding assembly 3 to the laminating means 12, so that the first film 4 can advance, for at least one segment of its path, along at least one first advancement path 18a which has at least one component substantially parallel to the first direction of extension 100a.

There are also second conveyor means 19 which, in turn, are configured to convey the second film 7, on its path from the second unwinding assembly 6 to the laminating means 12, so that the second film 7 can advance, for at least one segment of its path, along at least one second advancement path 19a, which has at least one component substantially parallel to the first direction of extension 100a, and along an advancement direction that is opposite to the advancement direction of the first film 4 along the first advancement path 18a.

In this manner, the first and the second film 4 and 7, in their advancement from the respective unwinding assemblies 3 and 6 to the laminating means 12, are basically moved so as to both converge from end regions of the machine, arranged along the first direction of extension 100a, where the respective unwinding assemblies 3 and 6 are located, toward the intermediate region of the machine, where the laminating means 12 are located.

For example, the first conveyor means 18 comprise a plurality of first advancement rollers 18b which engage the first film 4 so as to enable it to travel the first advancement path 18a, while the second conveyor means 19 comprise, conveniently, a plurality of second advancement rollers 19b which engage the second film 7 so as to enable it to travel the second advancement path 19a.

The machine furthermore has third conveyor means 20 which are configured to convey the third film 10, on its path from the third unwinding assembly 9 to the redirection means 17, so that the third film 10 can advance, for at least one segment of the path, along a third advancement path 20a, which has at least one component substantially perpendicular to the first direction of extension 100a.

Conveniently, the third conveyor means 20 comprise a plurality of third advancement rollers 20b, which are designed to engage the third film so as to guide it along the third advancement path 20a.

Basically, in this manner the third film 10 is fed to the laminating means 12 by making it travel at least one path segment with at least one component directed substantially perpendicularly to the first direction of extension 100a of the machine and, more specifically, substantially perpendicularly to a vertical plane 101 which is substantially parallel to the first direction of extension 100a, thus being fed, for at least one path segment, along a direction which is substantially perpendicular to the directions with which the first and the second film 4 and 7 are fed, for at least one segment of their path, to the laminating means 12.

It should be noted that the first, the second and the third conveyor means 18, 19 and 20 are conveniently arranged above the floor on which the machine is installed.

Conveniently, the laminating means 12 comprise at least one first laminating unit 21 and at least one second laminating unit 22 arranged in mutual succession.

In particular, each one of the laminating units 21 and 22 comprises at least two respective lamination rollers 21a, 21b and 22a, 22b, substantially parallel to and opposite to each other, so as to be able to act, on mutually opposite sides, on the films 4, 7 and 10 to be laminated.

More specifically, the lamination rollers 21a, 21b and 22a, 22b of the laminating unit 21 and 22 are oriented with their axes substantially perpendicular to the first direction of extension 100a and substantially parallel to the axis of the first and of the second spool 5 and 8.

In more detail, the first laminating unit 21 is configured to laminate two of the three films 4, 7, 10 together, so as to obtain a two-layer laminated film 23 in output from the first laminating unit, while the second laminating unit 22 is configured to laminate together the remaining film that is not yet laminated and the two-layer laminated film 23 obtained in the first laminating unit 21, so as to obtain the multilayer laminated film 13 in output from the second laminating unit 22.

According to the embodiment illustrated, the first laminating unit 21 is designed to laminate the first film 4 and the third film 10 together in order to obtain the two-layer laminated film 23, while the second laminating unit 22 is designed to laminate together the two-layer laminated film 23 exiting from the first laminating unit 21 and the second film 7, which is thus fed downstream of the first laminating unit 21, so as to obtain the multilayer laminated film 13 in output from the second laminating unit 22.

It should be noted that, before proceeding to laminate the films 4, 7 and 10 together, the applicator means 14 are used to apply adhesive material on at least two of the films 4, 7 and 10.

More specifically, the applicator means 14 comprise, conveniently, at least one first applicator assembly 24, which is arranged between the first unwinding assembly 3 and the first laminating unit 21 and is configured to apply at least one first layer of adhesive material on the face of the first film 4 that is intended to be laminated to the third film 10 at the first laminating unit 21.

The applicator means 14 further comprise at least one second applicator assembly 25, which is arranged, in turn, between the second unwinder 6 and the second laminating unit 22 and is configured to apply at least one second layer of adhesive material on the face of the second film 7 that is intended to be laminated to the two-layer laminated film 23 which exits from the first laminating unit 21.

Each applicator assembly 24 and 25 can, for example, comprise at least one respective applicator roller 24a and 25a, which cooperates with a respective counter-pressure roller 24b and 25b and which is positioned in contact with the relevant film 4, 7 to be coated with the adhesive material.

In particular, the applicator roller 24a, 25a of each applicator assembly 24, 25 is designed to take the adhesive material from a respective supply tank 24c, 25c and to distribute it on the corresponding film 4, 7.

Conveniently, the winding assembly 15 is arranged along the first direction of extension 100a of the machine, in a position interposed between the first unwinding assembly 3 and the second unwinding assembly 6.

Advantageously, the winding assembly 15 is located substantially proximate to the second laminating unit 22.

As illustrated, the redirection means 17 of the third film 10 can be provided starting from a diagonal turning bar 26, oriented substantially at 45° with respect to the direction along which the third film 10 reaches the diagonal bar and around which the third film 10 is made pass, so as to obtain a redirection of the advancement path of the third film 10 substantially through 90°, in so doing enabling the third film 10, which basically reaches the redirection means 17 from the third advancement path 20a, to proceed, downstream of the redirection means 17, along a direction which has at least one component substantially parallel to the first direction of extension 100a of the machine.

It should be noted that, if solvent-based adhesive materials are used, there are drying means 27a, 27b for the adhesive material between the applicator means 24, 25 and the laminating means 12, which are configured to dry the adhesive material before the laminating together of the films 4, 7 and 10 is executed.

For example, the drying means comprise means of dispensing hot air.

In particular, first drying means 27a are arranged along the path of the first film 4 from the first applicator means 24 to the laminating means.

More specifically, the first drying means 27a can be positioned at the first conveyor means 18.

There are also second drying means 27b, which are arranged along the path of the second film 7 from the second applicator means to the laminating means 12.

More specifically, the second drying means 27b are positioned at the second conveyor means 19.

The operation of the machine, according to the invention, is the following.

The first film 4 is taken by the first unwinding assembly 3 and is made advance to the laminating means 12, making it pass, by way of the first conveyor means 18, along the first advancement path 18a which has at least one component substantially parallel to the first direction of extension 100a of the machine.

On its path from the first unwinding assembly 3 to the laminating means 12, the first film 4 passes through the first applicator assembly 24 which applies the first layer of adhesive material on the face of the first film 4 that is intended to be subsequently laminated to the other films 7 and 10.

At the same time, the second film 7 is taken by the second unwinding assembly 6 and is made advance to the laminating means 12, conveying it, by way of the second conveyor means 19, along the second advancement path 19a, which also has at least one component substantially parallel to the first direction of extension 100a of the machine, it being moved along an advancement direction that is opposite to the advancement direction in which the first film 4 is moved along the first advancement path 18a.

The second film 7, along its path from the second unwinding assembly 6 to the laminating means 12, passes through the second applicator assembly which applies the second layer of adhesive material on the face of the second film 7 that is intended to be laminated to the other films 4 and 10.

The third film 10 is also taken from the third unwinding assembly 9, and initially it is made pass, by way of the third conveyor means 20, along the third advancement path 20a, so as to make it proceed along a direction having at least one component substantially perpendicular to the first direction of extension 100a of the machine.

Subsequently, the advancement path of the third film 10 is redirected by way of the redirection means 17, so that the third film 10 can continue on its path to the laminating means 12 by proceeding along a direction which has at least one component substantially parallel to the first direction of extension 100a of the machine.

The first film 4 and the third film 10 thus arrive at the first laminating unit 21, in which they are laminated together, so as to obtain, in output from the first laminating unit 21, the two-layer laminated film 23, which is, in turn, fed to the second laminating unit 22, at which the second film 7 also arrives, so as to obtain the multilayer laminated film 13 in output from the second laminating unit 22.

The multilayer laminated film 13 obtained is then wound by the winding assembly 15, so as to form the fourth spool 16.

In practice it has been found that the invention fully achieves the intended aim and objects by providing a laminating machine for producing multilayer laminated films, which offers a more compact structure compared to traditional triplex machines.

It is furthermore emphasized that the machine according to the invention does not require excavation under the floor to obtain passage pits, and thus is easier and more economical to install, in addition to being safer and more adapted to the production of films for the food, medical or pharmaceutical sectors, again compared to traditional triplex machines.

Another advantage of the machine according to the invention, deriving from the preceding advantage, is that, by not requiring the presence of passage pits, the machine according to the invention also does not require the installation of systems for ventilation and evacuation of explosive substances, such as solvents from the adhesive materials used, from the passage pits, something that is necessary in the known art.

Another advantage of the machine according to the invention is that it makes possible, in the step of starting the machine in which the machine is set up, less waste of laminated film with respect to the known art.

The machine according to the invention, thus conceived, is susceptible of numerous modifications and variations, all of which are within the scope of the appended claims. Moreover, all the details may be substituted by other, technically equivalent elements.

In practice, the materials used, as well as the contingent shapes and dimensions, may be any according to the requirements and to the state of the art.

The disclosures in Italian Patent Application No. 102023000000264 from which this application claims priority are incorporated herein by reference.

What is claimed is:

1. A laminating machine for producing multilayer films, comprising:

at least one first unwinding assembly, configured to take a first film from a first spool;

at least one second unwinding assembly, configured to take a second film from a second spool;

at least one third unwinding assembly, configured to take a third film from a third spool;

at least one first laminating unit and at least one second laminating unit configured to laminate together said first film, said second film and said third film, with the interposition of an adhesive material, in order to obtain a multilayer laminated film wherein said at least one first laminating unit and at least one second laminating unit are arranged in mutual succession, said first laminating unit being configured to laminate together two films from said first film, said second film, and said third film, said second laminating unit being configured to laminate a remaining film that is not yet laminated with the laminated film that was obtained in said first laminating unit;

at least one first applicator assembly and at least one second applicator assembly of said adhesive material, which are arranged upstream of said at least one first laminating unit and at least one second laminating unit;

at least one winding assembly for said multilayer laminated film, which is arranged downstream of said at least one first laminating unit and at least one second laminating unit;

said first unwinding assembly and said second unwinding assembly being arranged along a first direction of extension of the machine, wherein said third unwinding assembly is arranged along a second direction of extension of the machine which is substantially transverse with respect to said first direction of extension, said third unwinding assembly being positioned laterally with respect to a vertical plane of the machine which is substantially parallel to said first direction of extension and passes through said first unwinding assembly and said second unwinding assembly; and wherein said at least one first applicator assembly is arranged between said first unwinding assembly and said first laminating unit and configured to apply at least a first adhesive layer to the face of said first film that is intended to be laminated with said third film, and at least one second applicator assembly, arranged between said second unwinding assembly and said second laminating unit and configured to apply at least one second adhesive layer to the face of said second film that is intended to be laminated with the two-layer laminated film that exits from said first laminating unit;

a redirection element for said third film, between said third unwinding assembly and said at least one first laminating unit and at least one second laminating unit which is configured to redirect the advancement path of said third film along a direction having at least one component that is substantially parallel to said first direction of extension a plurality of first advancement rollers, configured to convey said first film from said first unwinding assembly to said at least one first laminating unit and at least one second laminating unit along at least one first advancement path, which has at least one component substantially parallel to said first direction of extension;

a plurality of second advancement rollers, configured to convey said second film from said second unwinding assembly to said at least one first laminating unit and at least one second laminating unit along at least one second advancement path, which has at least one component substantially parallel to said first direction of extension, and along an advancement direction that is opposite to the advancement direction of said first film along said first advancement path; and a plurality of third advancement rollers, configured to convey said third film from said third unwinding assembly to said redirection element along a third advancement path, which has at least one component substantially perpendicular to said first direction of extension.

2. The machine according to claim 1, wherein an axis of rotation of said third spool is parallel with respect to said first direction of extension of the machine.

3. The machine according to claim 1, wherein said at least one first laminating unit and at least one second laminating unit are interposed between said first unwinding assembly and said second unwinding assembly, along said first direction of extension.

4. The machine according to claim 1, wherein said first laminating unit is configured to laminate together said first film and said third film in order to obtain a two-layer laminated film, said second laminating unit being configured to laminate together the two-layer laminated film that exits from said first laminating unit and said second film, in order to obtain said multilayer laminated film.

5. The machine according to claim 1, wherein said winding assembly is interposed between said first unwinding assembly and said second unwinding assembly along said first direction of extension of the machine.

6. A method for producing multilayer films, comprising the steps of:

taking a first film from a first spool, a second film from a second spool, and a third film from a third spool;

laminating together, by virtue of said at least one first laminating unit and at least one second laminating unit, said first film, said second film and said third film by means of an interposition of an adhesive material applied prior to the lamination together of said first film, said second film and said third film, in order to obtain a multilayer laminated film wherein said adhesive material is applied to said first film by means of a first applicator assembly and said adhesive material is applied to said second film by means of a second applicator assembly;

rolling up the multilayer laminated film thus obtained;

said first film being taken by means of a first unwinding assembly and said second film by means of a second unwinding assembly;

wherein said third film is taken by means of a third unwinding assembly which is arranged laterally with respect to a vertical plane that passes through said first unwinding assembly and said second unwinding assembly;

moving said first film from said first unwinding assembly to said at least one first laminating unit, conveying said first film, by virtue of said plurality of first advancement rollers, at least along a first advancement path, which has at least one component substantially parallel to a first direction of extension;

moving said second film from said second unwinding assembly to said at least one second laminating unit, conveying said second film, by means of second advancement rollers, at least along a second advancement path, which has at least one component substantially parallel to said first direction of extension, and along an advancement direction that is opposite to an advancement direction with which said first film is conveyed along said first advancement path; and moving said third film from said third unwinding assembly to said at least one third laminating unit, conveying, initially, said third film, by means of third advancement rollers, at least along a third advancement path, which has at least one component substantially perpendicular to said first direction of extension, and, subsequently, redirection, by virtue of said redirection element, said third film in order to orient the advancement path of said third film along a direction which has at least one component substantially parallel to said first direction of extension.

7. The method according to claim 6, further comprising the step of applying said adhesive material to at least two films from said first film, said second film and said third film, prior to the lamination together of said first film, said second film and said third film.

8. The method according to claim 6, wherein the step of laminating together said first film, said second film and said third film by virtue of at least one laminating unit entails the steps of laminating together, initially, two films from said first film, said second film and said third film, by means of a first laminating unit, in order to obtain a two-layer laminated film, and of subsequently laminating said two-layer laminated film to the remaining film that is not yet laminated, by means of a second laminating unit, in order to obtain said multilayer laminated film.

9. The method according to claim 8, further comprising, in succession, the steps of laminating together, by means of said first laminating unit, said first film and said third film, in order to obtain said two-layer laminated film, and laminating together, by virtue of said second laminating unit, said two-layer laminated film and said second film.

\* \* \* \* \*